(12) United States Patent
Hansen (10) Patent No.: US 10,785,451 B1
(45) Date of Patent: Sep. 22, 2020

(54) LOW-BANDWIDTH AVATAR ANIMATION (71) Applicant: Twitter, Inc., San Francisco, CA (US)

(72) Inventor: Tyler Hansen, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/231,339

(22) Filed: Dec. 21, 2018

(51) Int. Cl.
*H04N 7/15* (2006.01)
*G06T 13/20* (2011.01)
*G06T 13/40* (2011.01)

(52) U.S. Cl.
CPC .......... *H04N 7/157* (2013.01); *G06T 13/205* (2013.01); *G06T 13/40* (2013.01)

(58) Field of Classification Search
USPC ...................................................... 348/14.07
See application file for complete search history.

(56) References Cited

U.S. PATENT DOCUMENTS

| | | | | |
|---|---|---|---|---|
| 2001/0044725 A1* | 11/2001 | Matsuda | ............... | G10L 19/00 704/269 |
| 2010/0332313 A1* | 12/2010 | Miller | ............... | G06Q 30/0257 705/14.44 |
| 2012/0223952 A1* | 9/2012 | Kanemaru | ............... | G06T 13/40 345/473 |
| 2014/0129344 A1* | 5/2014 | Smith | ............... | G06Q 30/0269 705/14.66 |
| 2014/0218371 A1* | 8/2014 | Du | ............... | G06T 13/80 345/473 |
| 2015/0215739 A1* | 7/2015 | Lee | ............... | H04W 64/006 455/457 |
| 2018/0091732 A1* | 3/2018 | Wilson | ............... | G06F 3/048 |

* cited by examiner

*Primary Examiner* — Amal S Zenati
(74) *Attorney, Agent, or Firm* — Fish & Richardson P.C.

(57) ABSTRACT

Methods, systems, and apparatus, including computer programs encoded on computer storage media, for generating avatars based on physical sensor measurements. One of the methods includes receiving, by a second user device from a video streaming platform system during a video streaming session between a first user device and the second user device, an updated physical sensor measurement of the first user device. An updated graphical representation of an avatar selected by a first user of the first user device is generated by the second user device based on the updated physical sensor measurement of the first user device. The updated graphical representation of the avatar is presented by the second user device on a display device of the second user device during a video streaming session between the first user device and the second user device.

21 Claims, 6 Drawing Sheets

LOW-BANDWIDTH AVATAR ANIMATION

BACKGROUND

This specification relates to a video streaming platform systems, and in particular, to video streaming platform systems that provide live, multi-user video streaming session functionality.

Some video streaming platforms provide live video streaming functionality. Live video streaming functionality allows a user to provide live streaming video to one or more other user devices in real-time. Typically, the video data is captured by an integrated camera or an auxiliary camera associated with the user device, e.g., by a built-in front-facing camera of a smart phone or a laptop or by a web camera of a desktop computer. In this specification, a video streaming session refers to an association of two or more user devices during a period of time in which one user device provides streaming video to one or more other user devices. In this specification, video data provided from one user device to another during a video streaming session will be referred to as a video stream.

During a video streaming session, multiple user devices can provide video streams. The video streaming platform supporting the video streaming session determines how the video streams are to be displayed by each respective user device. For example, at any particular point in time, a single video stream from a particular user device can be designated as the primary video stream and all other user devices can primarily display the primary video stream. The other user devices may also present secondary video streams in a less prominent manner.

User devices can also exchange non-video data during a video streaming session. For example, participants of the video streaming session can also submit text data that is broadcast and displayed to other users of the video streaming session. For brevity, in this specification, items of text data that are broadcast and displayed during a video streaming session will be referred to as user chats. In this specification, a collection of video stream data and non-video stream data received by a client device will be referred to as a session stream.

As another example of session stream data, participants of the video streaming session can also submit positive feedback indicators, e.g., likes or favorites, that can also be broadcast and displayed to other users of the video streaming session.

Not all user devices that participate in a video streaming session need to generate session stream data. For example, some user devices can participate in the video streaming session merely by receiving and presenting session stream data generated by other user devices.

Another type of session stream data is graphical user identifiers, which are graphical indicators that identify the users who are participating in a video streaming session. For example, during a video streaming session, users can use a profile image in order to identify themselves to other participants. A profile image can be a photograph of the user, for example. A profile image can also be an avatar, which is a computer-rendered graphical representation of the user, an object, or another character.

Video streaming sessions are naturally high-network-bandwidth applications. The continuous generation and reception of video streams by user devices consumes data at a rate that is orders of magnitude greater than other network-connected applications, e.g., voice communications, email, and text messaging.

In addition, synchronizing the user devices to have the same experience is a scalability problem for the video streaming platform. For example, the video streaming platform can take steps to ensure that all user devices obtain the primary video stream at roughly the same time and that all user devices view user chats at roughly the same time in the video stream.

Technologies exist for animating avatars in two and three dimensions. However, such animation techniques are generally computationally expensive and generate a large output that, if added to a video streaming session, would add significant additional data consumption for all participants of the video streaming session.

SUMMARY

This specification relates to a video streaming platform system that provides low-bandwidth avatar animation. The system performs low-bandwidth avatar animation by having the client software of a user device continually share a small number of numerical values rather than camera data or video data. The other devices in a video streaming session receive the numerical values and animate an avatar accordingly.

The subject matter described in this specification can be implemented in particular embodiments so as to realize one or more of the following advantages. A video streaming platform system can provide support for animated avatars that represent actual engagement by end users in a way that consumes very little bandwidth. In addition, the animation techniques are robust to poor network connection quality because the client software animates the transitions based on updates actually received. Therefore, users are guaranteed to see smooth avatar animations regardless of the quality of the network, which is a higher quality user experience relative to the choppiness of dropped video frames. In addition, the techniques described in this specification enhance user privacy by allowing for avatar animation that reflects actual user engagement but without requiring permissions to access to a camera of a user's device. Therefore, users can provide active and non-verbal engagement in a video streaming session without granting camera access permissions.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
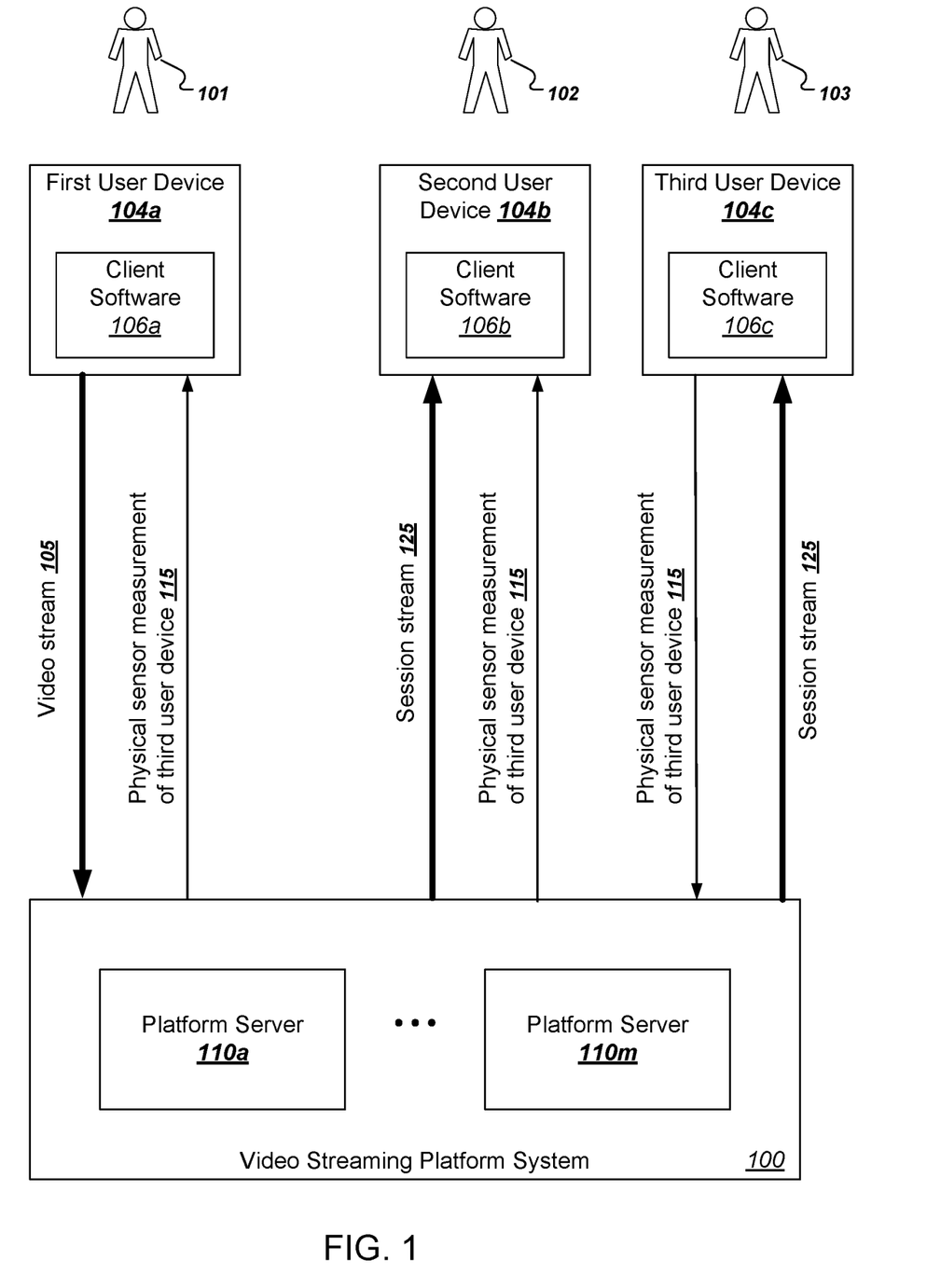
FIG. 1 illustrates an example online video streaming platform system.

FIG. 1 illustrates an example online video streaming platform system 100, or for brevity, the platform or the platform system 100. FIG. 1 also illustrates example user devices 104a, 104b, and 104c configured to interact with the platform system 100 over one or more data communication networks. The platform system 100, the user devices 104a-c, or both are configured, as will be described, to implement or perform one or more of the innovative technologies described in this specification.

The platform is implemented on one or more platform servers 110a-110m. Each platform server is implemented on one or more computers, e.g., on a cluster of computers.

Users 101-103 of the platform use user devices 104a-104c, on which client software 106a-106c is installed, to use the platform. The users 101-103 can interact with the platform system using the respective client software on their respective user devices.

A user may be account holder of an account, or an authorized user of an account, on the platform. In some implementations, the platform allows use of the platform by users who are not account holders or who are not logged in to an account of the platform. If the platform allows use by such users, the platform may allow such a user to participate in video streaming sessions by generating a video stream, receiving a video stream, or using other functionality of the platform by associating the user with a temporary account or identifier.

A user device can be any appropriate Internet-connected device, e.g., a laptop or desktop computer, a smartphone, a smart watch, or an electronic tablet. The user device can be connected to the Internet through a mobile network, through an Internet service provider (ISP), or otherwise.

Each user device is configured with software, which will be referred to as a client or as client software 106a-106c, that in operation can access the platform so that a user can participate in video streaming sessions. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform.

In operation, the users 101-103 use the three client devices 104a-c communicate with the platform to join a video streaming session. For example, the first user 101 of the first user device 104a can initiate a video streaming session and issue an invitation to users 102-103 of the other user devices 104b-c. Alternatively, the platform can broadcast an indication of the availability of a video stream initiated by the first user 101 of the first user device 104a, and then users 102-103 of the other user devices 104b-c can choose to join the video streaming session.

During the video streaming session, the first user device 104 generates a video stream 105 and provides the video stream 105 to the platform for distribution to other user devices participating in the video streaming session.

The platform system can then provide the video data and optionally other non-video data as a session stream 125 to both the second user device 104b and the third user device 104c.

During the video streaming session, a user 103 of the third user device 104c can select an avatar to be displayed at the other user devices as a graphical indication that the user 103 is participating in the video streaming session. The graphical representation of the avatar can be preinstalled in the client software 106a-c and therefore need not be shared among devices during the video streaming session.

The first user device 104a and the second user device 104b can display the avatar so that users 101-102 of those respective devices can see that the user 103 of the third user device 104c is participating in the video streaming session.

In order to drive animation of the avatar selected by the user 103 of the third user device 104c, the third user device 104c can continually generate values of a physical sensor measurement 115 that represents a physical state of the third user device 104c. The third user device 104c can then provide the physical sensor measurement 115 to the video streaming platform system 110 to be broadcast to the other user devices in the video streaming session.

Thus, the first user device 104a receives the physical sensor measurement 115 generated by the third user device 104c and updates the avatar selected by the user 103. Techniques for animating an avatar based on an updated physical sensor measurement are described in more detail below. In general, the physical sensor measurement is only a small number of numeric values, e.g., an audio volume or two degree measurements along an x and y axis. Therefore, the bandwidth required to receive and broadcast the physical sensor measurement 115 is much smaller than the bandwidth required to stream video data and is even smaller than the bandwidth required to broadcast chat data or other non-video session stream data.

The second user device 104b also receives physical sensor measurements 115 generated by the third user device 104c and updates the avatar selected by the user 103 based on the received physical sensor measurements 115. In this example, the second user device only receives data and does not provide any data for the session stream. Therefore, the second user device 104b may have more available network bandwidth than the first user device 104a. In such a situation, it is possible that some physical sensor measurements get dropped due to poor connection quality.

Thus, for example, it is entirely possible for the second user device 104b to receive an updated physical sensor measurement from the third user device 104c that is not received by the first user device 104a. However, such inconsistencies can be robustly handled by the client software 106a-c in a way that is imperceptible to the users. In particular, the client software 106a-c can animate smooth transitions between received physical sensor measurements. Therefore, if one is dropped due to poor network connectivity, the client software will simply present a different animation between the two actually received measurements. Therefore, the users 101-103 are guaranteed to always see smooth animation transitions regardless of the quality of their network connectivity. This user experience is thus very unlike the choppiness and jerkiness that inherently results from dropped video frames, and the system accomplishes this effect by exchanging only small numbers of numeric values between the devices that consume relatively small network bandwidth.

Figure 2:
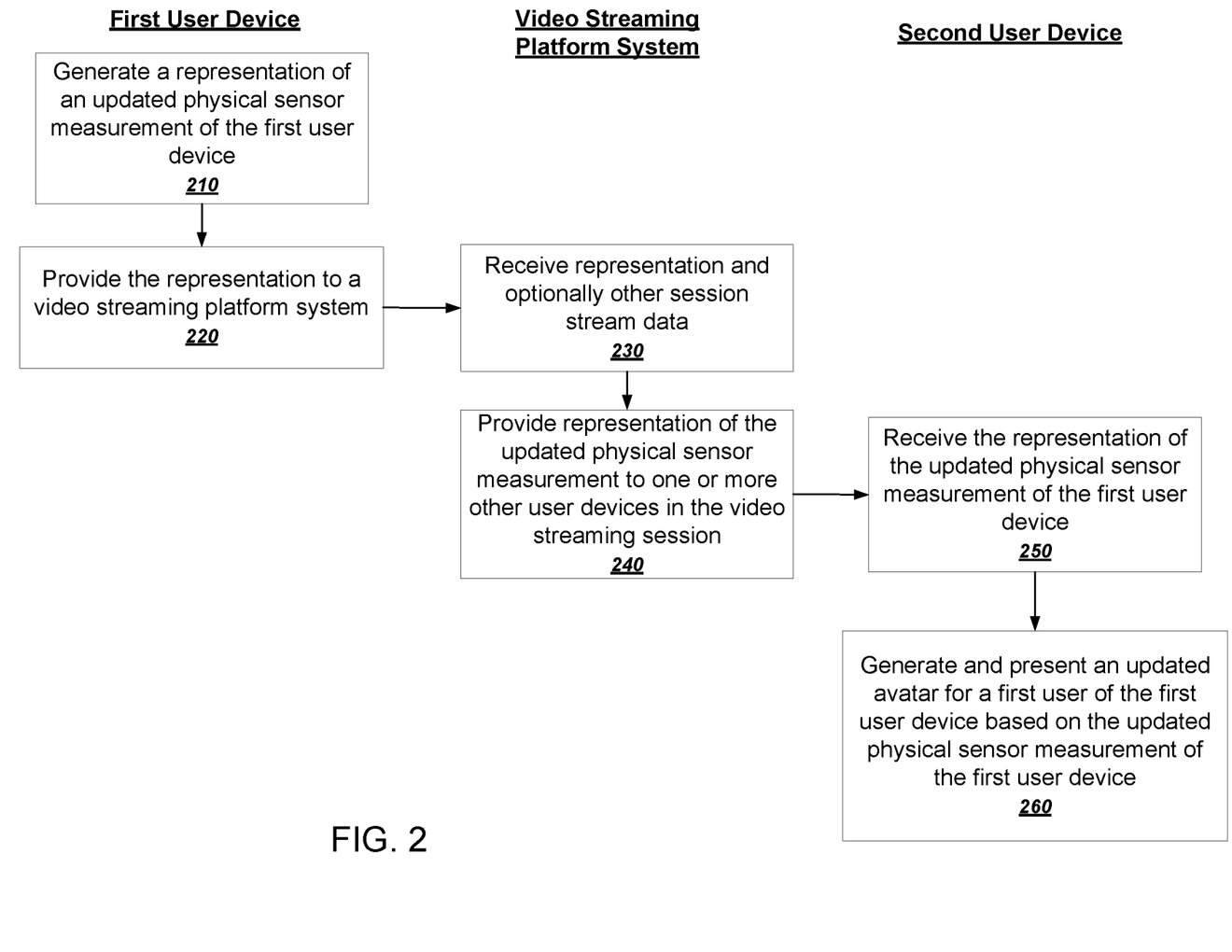
FIG. 2 is an example process for updating an avatar at a second device based on a physical sensor measurement at a first user device.

FIG. 2 is an example process for updating an avatar at a second device based on a physical sensor measurement at a first user device. The example process will be described in the context of the first device and the second device being in a video streaming session supported by a video streaming platform system. The example process describes sending a single physical sensor measurement from the first user device to the second user device. In an actual implementation, the example process would be performed many times per second, e.g., 10, 30, or 100 times per second, depending on processing capabilities of the devices and available network bandwidth.

The first user device generates an updated physical sensor measurement (210). The physical sensor measurement can be any appropriate value that represents a physical state of the first device. In order to reduce network latency of the system, the first user device can generate a relatively small number of physical sensor measurements, e.g., less than 10 values.

For example, the first device can generate a physical sensor measurement that represents one or more orientation measurements of the device in three-dimensional space, which can include a small number of numeric values. For example, the first device can generate one, two, or three angle measurements that represent the orientation of the device along respective axes. As others example, the first device can generate a physical sensor measurement that represents the change in orientation of the device relative to a previous orientation, e.g., the orientation velocity, or a rate of change in orientation of the device, e.g., the orientation acceleration.

The orientation measurements of the first device can be used to animate an avatar at the second user device in a way that simulates how the user is moving her or his device. The effect is similar to what a user at the second device would see if a video stream was actually being transmitted from the first user device. And this effect can be accomplished by generating and sending only a small number of numeric values without ever accessing a camera of the first device.

As another example, the first device can generate a physical sensor measurement that represents a measure of the raw or normalized audio volume being picked up by microphones of the device. For example, a raw value can be measured in decibels, and a normalized volume can be measured in terms of a percentile.

The audio volume of the first device can be used to animate an avatar at the second user device in a way that is commensurate with the audio level. One application of this technique is to use the avatar to simulate how the user at the first device is actually talking. For example, if the avatar has a mouth, the avatar can be animated to move its mouth to an angle that is commensurate with the audio volume, with greater volumes corresponding to wider mouth openings. As another example, if the avatar is a clump of flowers, the audio volume can be used to animate the flowers to sway in a gentle breeze for small volumes and sway in a strong breeze for large volumes. Again, the audio-volume based animations at the second device are being driven by only a single numeric value provided by the first device rather than actual raw audio waveforms, which dramatically reduces the latency of supporting the video stream.

Other physical sensor measurements can also be used. For example, the velocity of the first user device can be used to animate an avatar in a way that visually reflects the velocity of the first user device. For example, the visual representation can be animated to depict wind, e.g., y animating the avatar's hair to be blowing in the wind at a level of severity that is commensurate with the velocity. Alternatively or in addition, the visual representation can be more conceptual and less literal. For example, the visual representation can include animation that changes at a rate commensurate with the velocity of the first user device, e.g., an animation of a sparkling or glittering background.

The first user device provides the representation to a video streaming platform system (220).

The video streaming platform system receives the representation and optionally receives other session stream data (230). As mentioned above, the other session stream data can include video streams, chats, and other data from other user devices that are participating in the video stream. In some implementations, the video streaming platform system synchronizes the various items of data received so that when they are presented on a user device, the items of data appear at a time in the video stream corresponding to a time that the items were submitted at the originating device.

For example, if an user submits a chat in response to an event in the video stream displayed on the user's device, the video streaming platform system can synchronize the chat with other video stream data so that the chat appears on other users' devices at or around a same timestamp in the video stream at which the chat was submitted.

Similarly, the video streaming platform system can also synchronize the physical sensor measurements received from user devices. Therefore, when avatars are updated using the received physical sensor measurements, the animation of the avatar will change at a same point in the video stream at or around the timestamp at which the physical sensor measurement was taken by the device.

The video streaming platform system provides the representation of the updated physical sensor measurement to one or more other user devices in the video streaming session (240).

The second user device receives the representation of the updated physical sensor measurement of the first user device (250). The second user device may or may not also receive video streaming data from a third user device. However, the second user device need not receive video streaming data from the first user device because the first user device is providing only physical sensor measurements, which are all that are required to animate the first user's avatar.

The second user device generates and presents an updated avatar for the first user of the first user device based on the updated physical sensor measurement of the first user device (260). In general, the avatar is an image selected by the first user to represent the first user. How the avatar is updated depends on the type of the physical sensor measurement.

For example, if the physical sensor measurement is an updated orientation, the second user device can compute a difference between the updated orientation and a previous orientation received from the first user device. This, along with the time of the previous orientation, provides a measure of how quickly the first device is moving. The second user device can then update the avatar of the first user based on the measure of how quickly the first device is moving.

Figure 3A:
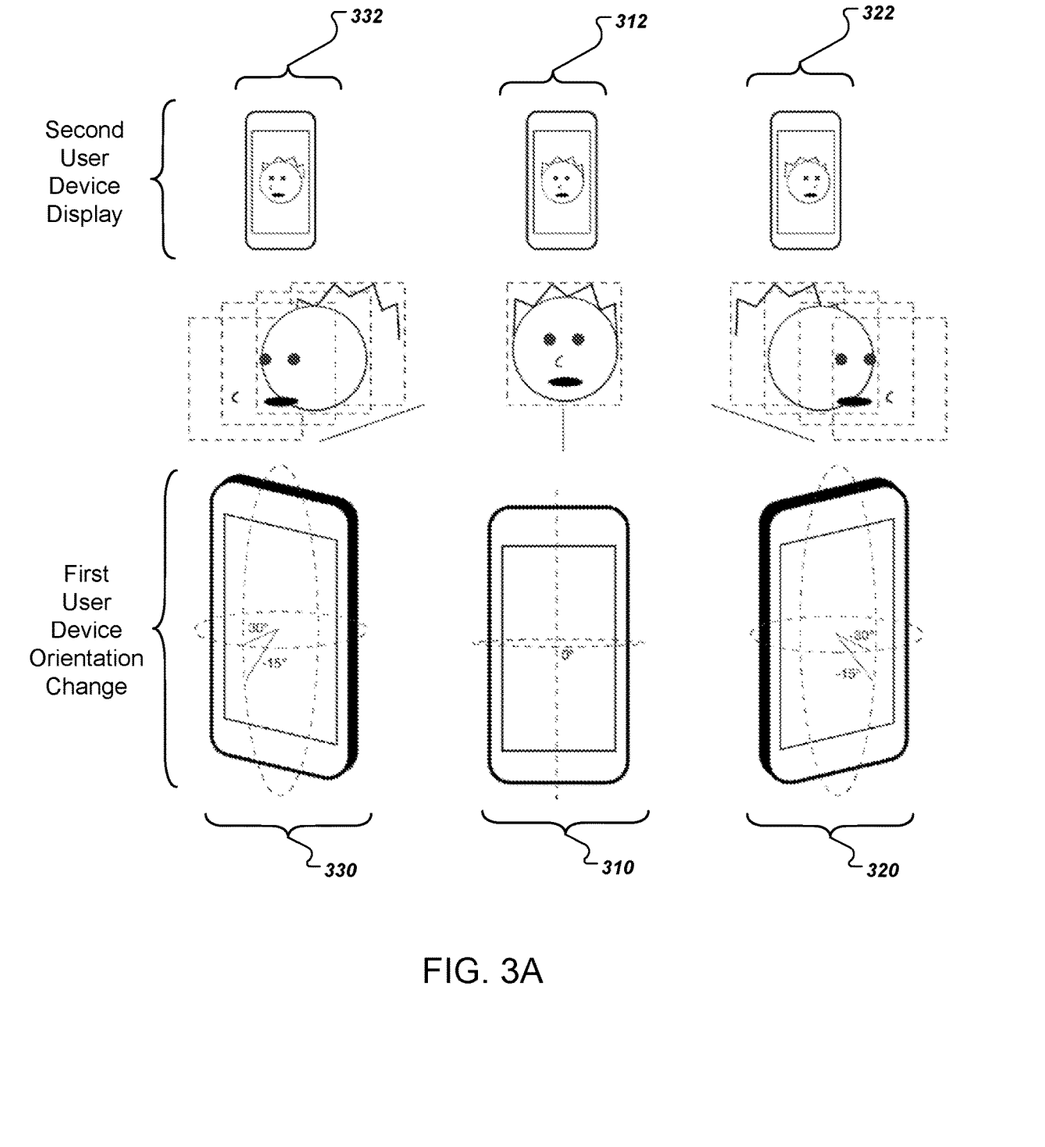
FIG. 3A illustrates an example of animating an avatar at a second user device due to changes in a first user device's orientation.

FIG. 3A illustrates an example of animating an avatar at a second user device due to changes in a first user device's orientation.

In the default state 310, when the first user device is not moving, the change in orientation is zero degrees along both a horizontal axis and a vertical axis. Thus, when the orientation is not changing, the second user device generates a default display 312 showing the avatar in a default state.

In the example state 320, the first user device moves to the right 30 degrees and down 15 degrees. The second user device receives these two values as an updated orientation of the first user device. In response, the second user device computes a difference between the updated orientation and the previous orientation of the first user device, e.g., as shown in the default state 310.

If the second user device determines that the first user device has moved or has moved more than a threshold number of degrees, the second user device can animate the first user's avatar based on the difference in orientations. For example, as shown in the right-looking display 322, the second user device can animate the first user's avatar to transition so that the avatar looks to the viewer's right.

Similarly, in the example state 330, the first user device moves left of center 30 degrees and down 15 degrees. The second user device receives these two values as an updated orientation of the first user device. In response, the second user device computes a difference between the updated orientation and the previous orientation of the first user device, e.g., as shown in the default state 310. If the second user device determines that the first user device has moved or has moved more than a threshold number of degrees, the second user device can animate the first user's avatar based on the difference in orientations. For example, the second user device can generate an animation that transitions the first user's avatar from the right-looking display 322 to the left-looking display 332, in which the second user device illustrates the first user's avatar looking to the viewer's left.

If, after a certain amount of time has passed, the second user device determines that the first user's device is no longer moving, the second user device can reanimate the first user's avatar to return to the default state as shown in the default display 312.

One important advantage of these techniques is that the nature of video streaming means that it is acceptable for some devices to drop some orientation updates. This means that different devices participating in the video stream can be showing different avatars of the first user at different times.

For example, suppose that due to poor network service, a third user device dropped the update for state 320 and received only the update for state 330. In that case, the third user device simply displays an animation that transitions from the default state 312 to the left-looking display 332 without displaying the right-looking display 322.

And because the devices are basing the avatar animation on a previously received orientation, the animation transitions can always be smooth no matter how bad the network connection becomes. In other words, the second user device can generate an animation that smoothly transitions the first user's avatar from the right-looking display 322 to the left-looking display 332. Meanwhile, the third user device, which never received any measurements from the state 320, simply generates an animation that smoothly transitions the first user's avatar from the default display 312 to the left-looking display 332.

Figure 3B:
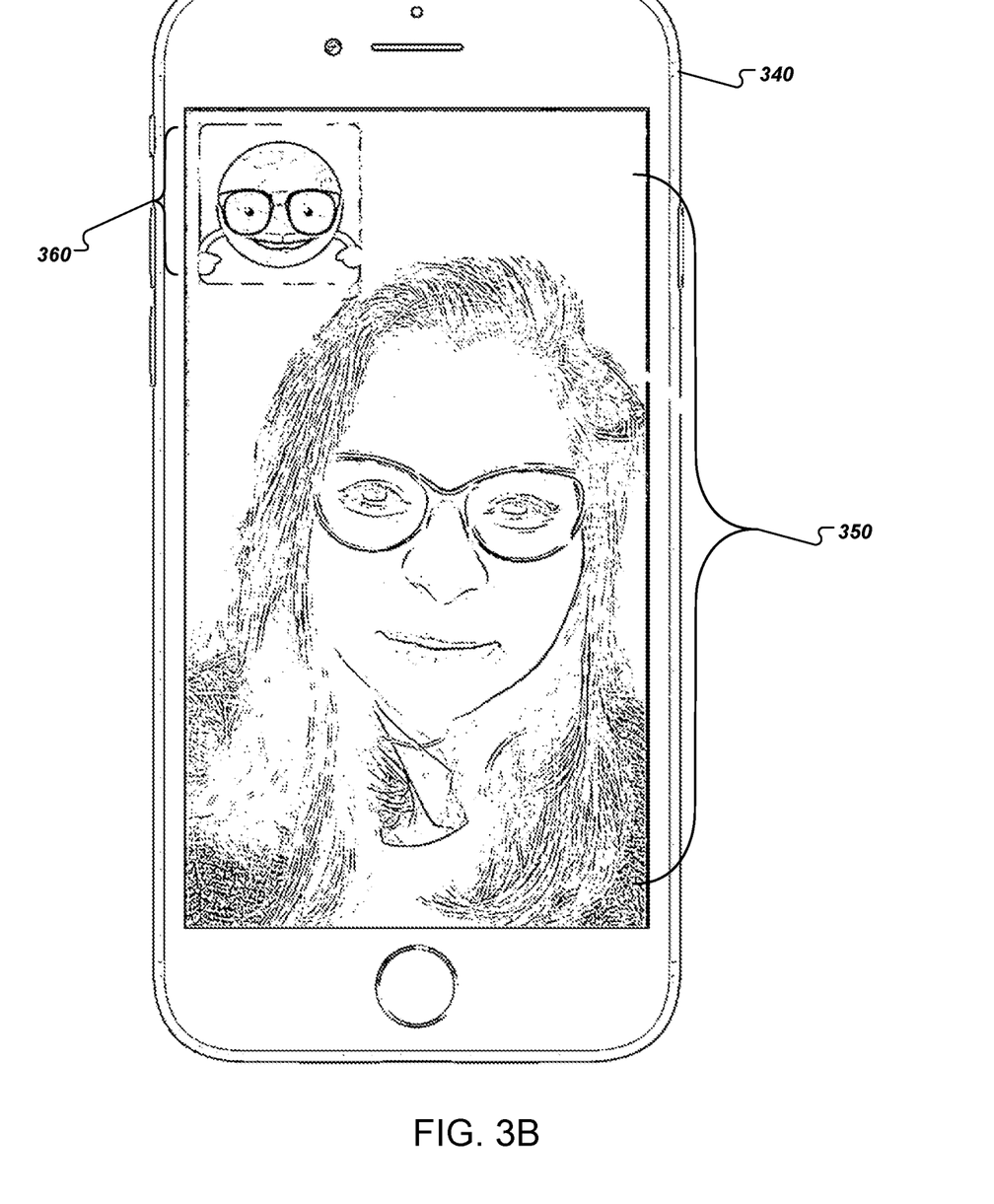
FIG. 3B illustrates an example user interface having an animated avatar.

FIG. 3B illustrates an example user interface having an animated avatar. The example user interface is displayed by a user device 340 that is currently engaged in a video streaming session.

The example user interface has a main portion 350 that displays a video stream that is generated by a user device participating in the video streaming session. The content of the main portion 350 can be generated by the user device 340, if the user device 340 is getting the video stream, or can be generated by a different user device if the user device 340 is merely participating in the video stream.

The example user interface also has an avatar portion 360 that presents a globe man avatar that can be animated according to the techniques described in this specification. The avatar in the avatar portion 360 can be an avatar of a user of the user device 340 or a different user device that is participating in the video streaming session.

For example, if the user for the avatar moves the corresponding device, the sensor measurements can be used to animate the globe man avatar accordingly. For example, a remote user device for a user owning the avatar can send sensor measurements to the user device 340, and the user device 340 can animate the globe man avatar in the avatar portion 340. Notably, the bandwidth required to communicate the sensor measurements for animating the avatar in the avatar portion 360 is much smaller than the bandwidth required to communicate the video data for the main portion 350.

Figure 4:
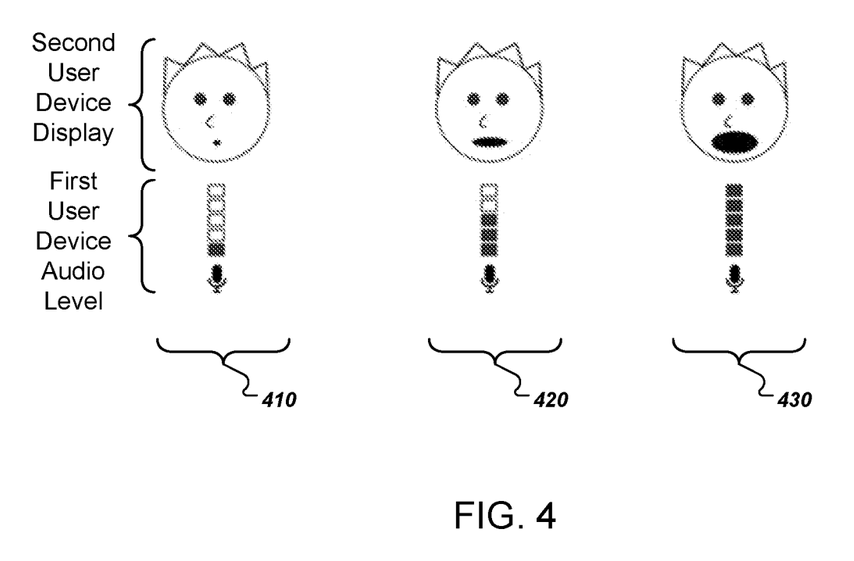
FIG. 4 illustrates an example of animating an avatar at a second user device due to changes in a first user device's audio volume.

FIG. 4 illustrates an example of animating an avatar at a second user device due to changes in a first user device's audio volume.

In the state 410, the first user device measures a normalized volume level that is in the bottom $20^{th}$ percentile. As illustrated in FIG. 4, this corresponds to only 1 bar out of 5.

The second user device receives the measurement of the volume and animates the first user's avatar to match the measurement. In this example, the state 410 corresponds to an avatar having a mouth that is almost closed.

Similarly, in the state 420, the first user device measures a normalized volume level that above the $60^{th}$ percentile. When the second user device receives this measurement, the second user device can update the first user's avatar by displaying the mouth of the avatar more open than for state 410.

And in the state 430, the first user device measures a normalized volume level that is above the $80^{th}$ percentile. When the second user device receives this measurement, the second user device can update the first user's avatar by displaying the mouth of the avatar at a maximum level of openness.

The implementations described above related to low-bandwidth avatar animation in the context of high-bandwidth video streaming sessions. However, the same or similar techniques can also be used to augment lower-bandwidth applications that do not involve live video streaming. For example, the techniques described above can be used to animate avatars in a purely audio streaming session, e.g., a podcast, radio, or another audio presentation that many users are listening to and commenting on in real time. In addition, live content streaming need not be present at all. For example the same or similar techniques could be used to animate avatars for users that are merely participating in a text chat room or chat session.

In addition to the implementations described above that relate to video streaming sessions, the same or similar techniques can be used to augment other types of content shared between uses in a content sharing platform. For example, a social messaging platform that allows users to post messages to one another publicly or privately can use the techniques described above to animate avatars in rich media content postings. For example, a user can generate a new message for her followers on the platform. The new message when viewed by the followers can contain image content captured by the user, in addition to an animated avatar that represents the user's reaction to the image content. The platform can generate the animated avatar using only physical sensor measurements recorded by the user's device at the time that the image content was captured. For example if the user loudly says, "WOW" at the time the user captures an interesting image, the platform can use the audio volume captured at that time to animate an avatar that opens its mouth widely within the message content. And the avatar animation can reflect this reaction from the user without ever having access to a camera of the user's device.

Figure 5:
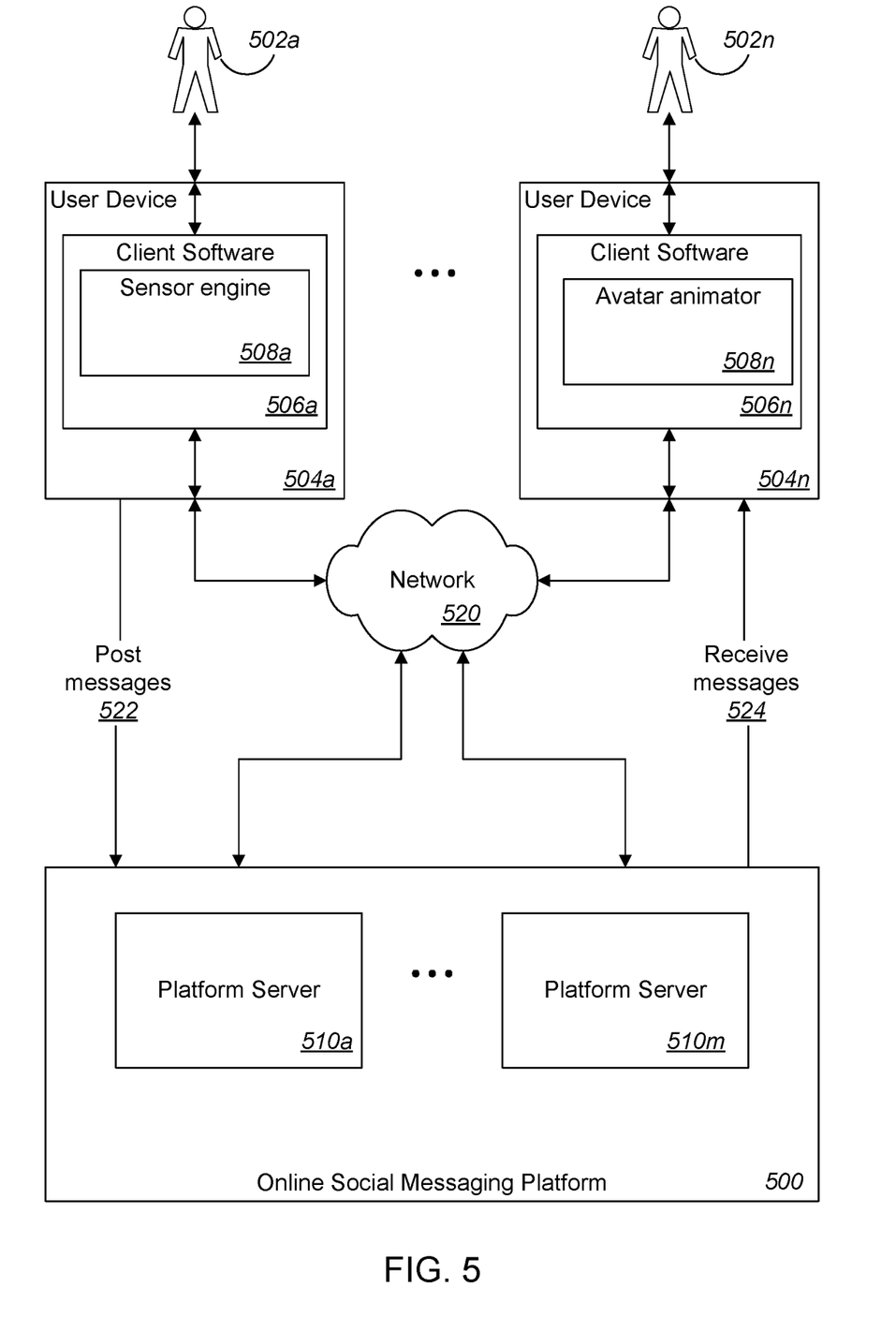
FIG. 5 illustrates an example online social messaging platform and example user devices configured to interact with the platform over one or more data communication networks.

FIG. 5 illustrates an example online social messaging platform 500 and example user devices 504a-504n configured to interact with the platform over one or more data communication networks 120. The platform, the user devices, or both are configured, as will be described, to implement or perform one or more of the animated avatar techniques described in this specification. For example, the platform 500 can be used as a video streaming platform that distributes physical sensors measurements during a video streaming session for the purpose of animating avatars. Alternatively or in addition, the platform 500 can be used to animate avatars in social messaging platform messages as described above.

The platform is implemented on one or more servers 510*a*-510*m*. Each server is implemented on one or more computers, e.g., on a cluster of computers. As described above, each of the platform servers can receive physical sensor measurements from user devices, which the system can forward to other user devices.

Users 502*a*-502*n* of the platform use user devices 504*a*-504*n*, on which client software 506*a*-506*n* is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 506*a*-506*n*, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

The social messaging platform 500 is implemented on one or more computers in one or more locations that operate as one or more servers that support connections over wired or wireless networks 520 from many different kinds of user devices. The platform may have many millions of accounts, and anywhere from hundreds of thousands to millions of connections may be established or in use between clients and the platform at any given moment.

The platform facilitates real-time communication. The platform and client software are configured to enable users to use the platform to post messages 522 to the platform and to use the platform to receive messages 524 posted by other users. In some implementations, the platform provides facilities for users to send messages directly to one or more other users of the platform, allowing the sender and recipients to maintain a private exchange of messages.

To provide for low-bandwidth avatar animation, a sensor engine 508*a* can record physical sensor measurements, which the user device 504*a* can send along with a message 522 to the platform 500. The platform 500 can provide the message 524 and the physical sensor measurement to another user device 504*n*. An avatar animator 508*n* can use the physical sensor measurements to animate an avatar corresponds to the physical sensor measurements, as described above.

The platform is configured to provide content, generally messages, to a user in a home feed message stream. The messages will generally be messages from accounts the user is following, meaning that the recipient has registered to receive messages posted by the followed account, and optionally content that such accounts have engaged with, e.g., endorsed. Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages, providing message streams on client request, managing accounts, managing connections between accounts, messages, and streams, and receiving engagement data from clients engaging with messages. The platform also indexes content items and access data and can provide the indexed data to account holders.

In some implementations of the platform, a message contains data representing content provided by the author of the message. The message may be a container data type storing the content data. The types of data that may be stored in a message include text, graphics, images, video, and computer code, e.g., uniform resource locators (URLs), for example. Messages can also include key phrases, e.g., hashtags, that can aid in categorizing or relating messages to topics. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be republications of a message composed by and received from another account. Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows messages to be private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

A message stream is a stream of messages on the platform that meet one or more stream criteria. A message stream can be defined by the stream criteria to include messages posted by one or more accounts. For example, the contents of a message stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Message streams may also be ordered in other ways, e.g., according to a computationally predicted relevance to the account holder, or according to some combination of time and relevance score.

A message stream may potentially include a large number of messages. For both processing efficiency and the requesting account holder's viewing convenience, the platform generally identifies a subset of messages meeting the stream criteria to send to a requesting client once the message stream is generated. The remainder of the messages in the stream are maintained in a stream repository and can be accessed upon client request.

Accounts will in general have relationships with other accounts on the platform. Relationships between accounts of the platform are represented by connection data maintained by the platform, e.g., in the form of data representing one or more connection graphs. The connection data may be maintained in a connection repository. A connection graph includes nodes representing accounts of the platform and edges connecting the nodes according to the respective relationships between the entities represented by the nodes. A relationship may be any kind of association between accounts, e.g., a following, friending, subscribing, tracking, liking, tagging, or other relationship. The edges of the connection graph may be directed or undirected based on the type of relationship.

In some implementations, the platform tracks engagement with messages. In some implementations, the platform maintains, in a message repository, data that describes each message as well as the engagement with each message.

Engagement data can include any type of information describing user activity related to a message by an engaging account of the platform. Examples of engagement by a user include, for example, viewing an avatar animation in a message, reposting the message, marking the message to indicate is a favorite of, liked by, or endorsed by the user, responding to the message, and mentioning or referencing the message. Engagement data may also include how many followers, connections, and/or friends of the context account have connections with the engaging account, e.g., are in a connection graph of the engaging account, or an indication that the context account is a favorite account of the engaging account.

Engagement data can also include any type of information describing activity related to a context account by an engaging account of the platform. A context account is any account that a user, i.e., the engaging account, is engaging with. And engagement data relating to a context account can be data about engagement activity of that account or engagement activity by others with that account.

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

In some implementations, the platform includes numerous different but functionally equivalent front end servers, which are dedicated to managing network connections with remote clients.

The front end servers provide a variety of interfaces for interacting with different types of clients. For example, when a web browser accesses the platform, a web interface module in the front end module provides the client access. Similarly, when a client calls an API made available by the platform for such a purpose, an API interface provides the client access.

The front end servers are configured to communicate with other servers of the platform, which carry out the bulk of the computational processing performed by the platform as a whole.

A routing module stores newly composed messages in a message repository. The routing module also stores an identifier for each message. The identifier is used to identify a message that is to be included in a stream. This allows the message to be stored only once and accessed for a variety of different streams without needing to store more than one copy of the message.

A graph module manages connections between accounts. Connections determine which streams include messages from which accounts. In some implementations, the platform uses unidirectional connections between accounts and streams to allow account holders to subscribe to the message streams of other accounts. A unidirectional connection does not necessarily imply any sort of reciprocal relationship. An account holder who establishes a unidirectional connection to receive another account's message stream may be referred to as a "follower," and the act of creating the unidirectional connection is referred to as "following" another account.

The graph module receives client requests to create and delete unidirectional connections between accounts. In some implementations, these connections are stored in a relationship repository as part of a unidirectional connection graph. Each connection in the connection graph repository references an account in the account repository or a stream in the stream repository.

In the same or a different embodiment, the graph module can provide and manage bidirectional connections. In a bidirectional connection, both accounts are considered subscribed to each other's account message streams. The graph module stores bidirectional connections in the relationship repository. In some implementations, the platform and connection graph repository include both unidirectional and bidirectional connections.

A delivery module constructs message streams and provides them to requesting clients, for example, through a front end server. Responding to a request for a stream, the delivery module either constructs the stream in real time, or accesses from a stream repository some or all of a stream that has already been generated. The delivery module stores generated streams in the stream repository. An account holder may request any of their own streams, or the streams of any other account that they are permitted to access based on security settings. If a stream includes a large number of messages, the delivery module generally identifies a subset of the messages to send to a requesting client, in which case the remainder of the messages are maintained in a stream repository and sent upon client request.

An account module enable account holders to manage their platform accounts. The account module allows an account holder to manage privacy and security settings, and their connections to other account holders.

Generally, the platform does not require the account holder to provide a large amount of personal information. This personal information can include, for example, an account name, which is not necessarily a real name, an identifier, a user name, a picture, a brief description of themselves or the entity, an e-mail address, and a website. The personal information does not necessarily include, and may purposefully exclude, real-world identifying information like age, gender, interests, history, occupation, and so on. Information about each account is stored in an account repository.

Client software allows account holders receiving a stream to engage, e.g., interact with, comment on, or repost, the messages in the stream. An engagement module receives these engagements and stores them in an engagement repository. Types of engagement include selecting a message for more information regarding the message, selecting a URI (universal resource identifier) or hashtag in a message, reposting the message, or making a message a favorite. Other example engagements types include opening a "card" attached to message, which presents additional content that is a target of a link in the message, or links to an application installed on the user device. Account holders may engage further with the additional content, e.g., by playing a video or audio file or by voting in a poll.

In addition to recording active interactions with messages through explicitly received user device input, the engagement module may also record passive interactions with messages. An impression occurs when a client presents the content of a message on a user device. Impression engagements include the mere fact that an impression occurred, as well as other information, e.g., whether a message in a stream appeared on a display of the user device, and how long the message appeared on the display.

Any engagement stored in the engagement repository may reference the messages, accounts, and/or stream involved in the engagement.

Engagements may also be categorized beyond their type. Example categories include engagements expressing a positive sentiment about a message ("positive engagements"), engagements expressing a negative sentiment about a message ("negative engagements"), engagements that allow an advertiser account to receive monetary compensation ("monetizable engagements"), engagements that are expected to result in additional future engagements ("performance engagements"), or connection engagements that are likely to result in one account holder following another account ("connection engagements"). The negative engagements category includes, for example, engagements dismissing a message or reporting a message as offensive while the positive engagements category typically includes engagements not in the negative engagements category. Example performance engagements include selecting a URL (uniform resource locator) in a message or expanding a card. Example monetizable engagements include, for example, engagements that result in an eventual purchase or a software application install on a user device. Generally, categories and types are not coextensive; a given type of engagement may fall into more than one category and vice versa.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing devices, cause the devices to perform the operations or actions. For special-purpose logic circuitry to be configured to perform particular operations or actions means that the circuitry has electronic logic that performs the operations or actions.

In addition to the embodiments of the attached embodiments and the embodiments described above, the following embodiments are also innovative:

Embodiment 1 is a method comprising:

receiving, by a second user device from a video streaming platform system during a video streaming session between a first user device and the second user device, an updated physical sensor measurement of the first user device;

generating, by the second user device, an updated graphical representation of an avatar selected by a first user of the first user device based on the updated physical sensor measurement of the first user device; and presenting, by the second user device, the updated graphical representation of the avatar on a display device of the second user device during a video streaming session between the first user device and the second user device.

Embodiment 2 is the method of embodiment 1, further comprising:

generating, by the first user device during a video streaming session between the first user device and the second user device, the representation of an updated physical sensor measurement of the first user device; and providing, by the first user device to the video streaming platform system, the representation of the updated physical sensor measurement of the first user device;

Embodiment 3 is the method of any one of embodiments 1-2, wherein the updated physical sensor measurement of the first user device is an updated orientation of the first user device along one or more axes.

Embodiment 4 is the method of any of embodiment 3, wherein generating an updated graphical representation of the avatar selected by the first user of the first user device based on the updated physical sensor measurement of the first user device comprises:

obtaining a previously received orientation of the first user device;

computing a difference between the updated orientation of the first user device and the previous orientation of the first user device; and generating the updated graphical representation based on the computed difference between the updated orientation of the first user device and the previous orientation of the first user device.

Embodiment 5 is the method of embodiment 8, wherein the representation of the current orientation of the user device comprises only two numeric values.

Embodiment 6 is the method of any one of embodiments 1-5, wherein the updated physical sensor measurement of the first user device is an audio level of the first user device.

Embodiment 7 is the method of embodiment 6, wherein generating an updated graphical representation of an avatar selected by a first user of the first user device based on the updated physical sensor measurement of the first user device comprises:

computing a degree of mouth openness for a mouth of the avatar based on the audio level of the first user device; and generating a mouth portion of the avatar based on the computed degree of mouth openness.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
    a first user device comprising one or more computers and one or more storage devices storing instructions that are operable, when executed by the one or more computers, to cause the one or more computers to perform first operations comprising:
        generating, during a video streaming session between the first user device and a second user device, a representation of an updated physical sensor measurement, wherein the representation comprises one or more values that represent an updated orientation of the first user device; and
        providing the representation of the updated physical sensor measurement to a video streaming platform system; and
    a second user device comprising one or more computers and one or more storage devices storing instructions that are operable, when executed by the one or more computers, to cause the one or more computers to perform second operations comprising:
        receiving, by the second user device from the video streaming platform system during the video streaming session, the representation of the updated physical sensor measurement;
        obtaining, by the second user device, a previously received orientation of the first user device;
        computing, by the second user device, a difference between the updated orientation of the first user device and the previously received orientation of the first user device;
        generating, by the second user device based on the computed difference between the updated orientation of the first user device and the previously received orientation of the first user device, an updated graphical representation of an avatar selected by a first user of the first user device; and
        presenting, by the second user device, the updated graphical representation of the avatar on a display of the second user device during the video streaming session.

2. The system of claim 1, wherein generating, by the second user device, an updated graphical representation of an avatar selected by a first user of the first user device comprises:
    receiving, by the second user device from the video streaming platform system during the video streaming session, an audio level of the first user device measured by one or more microphones of the first user device;
    computing a degree of mouth openness for a mouth of the avatar based on the audio level; and
    generating the mouth of the avatar based on the computed degree of mouth openness.

3. The system of claim 1, wherein generating, by the second user device, the updated graphical representation comprises:
    determining, based on the updated orientation and the previously received orientation, that the first user device has moved more than a threshold number of degrees; and responsive to determining that the first user device has moved more than a threshold number of degrees, generating the updated graphical representation of the avatar.

4. The system of claim 1, wherein generating, by the second user device, the updated graphical representation comprises:
   determining, based on the updated orientation, the previously received orientation, and a time associated with the previously received orientation, an orientation velocity; and
   generating the updated graphical representation of the avatar based on the orientation velocity.

5. A method comprising:
   generating, by a first user device during a video streaming session between the first user device and a second user device, a representation of an updated physical sensor measurement, wherein the representation comprises one or more values that represent an updated orientation of the first user device;
   providing, by the first user device to a video streaming platform system, the representation of the updated physical sensor measurement;
   receiving, by the second user device from the video streaming platform system during the video streaming session, the representation of the updated physical sensor measurement;
   obtaining, by the second user device, a previously received orientation of the first user device;
   computing, by the second user device, a difference between the updated orientation of the first user device and the previously received orientation of the first user device;
   generating, by the second user device based on the computed difference between the updated orientation of the first user device and the previously received orientation of the first user device, an updated graphical representation of an avatar selected by a first user of the first user device; and
   presenting, by the second user device, the updated graphical representation of the avatar on a display of the second user device during the video streaming session.

6. The method of claim 5, wherein generating, by the second user device, the updated graphical representation comprises:
   determining, based on the updated orientation, the previously received orientation, and a time associated with the previously received orientation, an orientation velocity; and
   generating the updated graphical representation of the avatar based on the orientation velocity.

7. The system of claim 1, wherein generating, by the second user device, the updated graphical representation comprises animating the avatar to transition from a first graphical representation to a second graphical representation, the first graphical representation corresponding to the previously received orientation and the second graphical representation corresponding to the updated orientation.

8. The system of claim 1, wherein the first operations further comprise:
   presenting, by the first user device, the updated graphical representation of the avatar on a display of the first user device during the video streaming session.

9. The system of claim 1, wherein generating, by the second user device, the updated graphical representation, comprises generating the avatar to face a direction on the display of the second user device that corresponds, after the first user device is positioned in the updated orientation, to a direction faced by a display of the first user device relative to a default state.

10. The method of claim 5, wherein generating, by the second user device, the updated graphical representation comprises:
    determining, based on the updated orientation and the previously received orientation, that the first user device has moved more than a threshold number of degrees; and
    responsive to determining that the first user device has moved more than a threshold number of degrees, generating the updated graphical representation of the avatar.

11. The method of claim 5, wherein generating, by the second user device, an updated graphical representation of an avatar selected by a first user of the first user device comprises:
    receiving, by the second user device from the video streaming platform system during the video streaming session, an audio level of the first user device measured by one or more microphones of the first user device;
    computing a degree of mouth openness for a mouth of the avatar based on the audio level; and
    generating the mouth of the avatar based on the computed degree of mouth openness.

12. The method of claim 5, wherein generating, by the second user device, the updated graphical representation comprises animating the avatar to transition from a first graphical representation to a second graphical representation, the first graphical representation corresponding to the previously received orientation and the second graphical representation corresponding to the updated orientation.

13. The method of claim 5, further comprising:
    presenting, by the first user device, the updated graphical representation of the avatar on a display of the first user device during the video streaming session.

14. The method of claim 5, wherein generating, by the second user device, the updated graphical representation, comprises generating the avatar to face a direction on the display of the second user device that corresponds, after the first user device is positioned in the updated orientation, to a direction faced by a display of the first user device relative to a default state.

15. One or more non-transitory computer storage media encoded with computer program instructions that when executed by one or more computers cause the one or more computers to perform operations comprising:
    generating, by a first user device during a video streaming session between the first user device and a second user device, a representation of an updated physical sensor measurement, wherein the representation comprises one or more values that represent an updated orientation of the first user device;
    providing, by the first user device to a video streaming platform system, the representation of the updated physical sensor measurement;
    receiving, by the second user device from the video streaming platform system during the video streaming session, the representation of the updated physical sensor measurement;
    obtaining, by the second user device, a previously received orientation of the first user device;
    computing, by the second user device, a difference between the updated orientation of the first user device and the previously received orientation of the first user device;

generating, by the second user device based on the computed difference between the updated orientation of the first user device and the previously received orientation of the first user device, an updated graphical representation of an avatar selected by a first user of the first user device; and presenting, by the second user device, the updated graphical representation of the avatar on a display of the second user device during the video streaming session.

16. The one or more non-transitory computer storage media of claim 15, wherein generating, by the second user device, an updated graphical representation of an avatar selected by a first user of the first user device comprises:

receiving, by the second user device from the video streaming platform system during the video streaming session, an audio level of the first user device measured by one or more microphones of the first user device;

computing a degree of mouth openness for a mouth of the avatar based on the audio level; and generating the mouth of the avatar based on the computed degree of mouth openness.

17. The one or more non-transitory computer storage media of claim 15, wherein generating, by the second user device, the updated graphical representation comprises:

determining, based on the updated orientation and the previously received orientation, that the first user device has moved more than a threshold number of degrees; and responsive to determining that the first user device has moved more than a threshold number of degrees, generating the updated graphical representation of the avatar.

18. The one or more non-transitory computer storage media of claim 15, wherein generating, by the second user device, the updated graphical representation comprises:

determining, based on the updated orientation, the previously received orientation, and a time associated with the previously received orientation, an orientation velocity; and generating the updated graphical representation of the avatar based on the orientation velocity.

19. The one or more non-transitory computer storage media of claim 15, wherein generating, by the second user device, the updated graphical representation comprises animating the avatar to transition from a first graphical representation to a second graphical representation, the first graphical representation corresponding to the previously received orientation and the second graphical representation corresponding to the updated orientation.

20. The one or more non-transitory computer storage media of claim 15, wherein the operations further comprise:

presenting, by the first user device, the updated graphical representation of the avatar on a display of the first user device during the video streaming session.

21. The one or more non-transitory computer storage media of claim 15, wherein generating, by the second user device, the updated graphical representation, comprises generating the avatar to face a direction on the display of the second user device that corresponds, after the first user device is positioned in the updated orientation, to a direction faced by a display of the first user device relative to a default state.

* * * * *